United States Patent
Becker et al.

(10) Patent No.: US 7,181,301 B2
(45) Date of Patent: Feb. 20, 2007

(54) ENGINEERING AND AUTOMATION SYSTEM

(75) Inventors: Norbert Becker, Erlangen (DE); Peter Brinzer, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 131 days.

(21) Appl. No.: 10/851,329

(22) Filed: May 24, 2004

(65) Prior Publication Data

US 2005/0010316 A1    Jan. 13, 2005

Related U.S. Application Data

(63) Continuation of application No. PCT/DE02/04294, filed on Nov. 22, 2002.

(30) Foreign Application Priority Data

Nov. 23, 2001 (DE) ............... 101 57 539

(51) Int. Cl.
*G06F 19/00* (2006.01)
*G06F 17/30* (2006.01)

(52) U.S. Cl. ............... 700/95; 707/10
(58) Field of Classification Search ............ 700/95, 700/108, 117, 159, 170; 707/10, 101, 8, 707/104.1, 103 R
See application file for complete search history.

(56) References Cited

U.S. PATENT DOCUMENTS

| | | | | |
|---|---|---|---|---|
| 4,635,189 A | * | 1/1987 | Kendall | 707/10 |
| 5,301,270 A | * | 4/1994 | Steinberg et al. | 715/866 |
| 5,546,580 A | * | 8/1996 | Seliger et al. | 707/8 |
| 5,914,880 A | * | 6/1999 | Yasojima et al. | 700/159 |
| 6,014,670 A | * | 1/2000 | Zamanian et al. | 707/101 |
| 6,163,761 A | * | 12/2000 | Kent | 702/187 |
| 2003/0182298 A1 | * | 9/2003 | Kalthoff et al. | 707/101 |

FOREIGN PATENT DOCUMENTS

EP    0 362 971 A2    4/1990

OTHER PUBLICATIONS

A. W. Scheer, "CIM, Computer Integerated Manufacturing/Der computergesteuerte Industriebetrieb," Springer-Verlag, Berlin, Germany, 1988, pp. 109-117.

* cited by examiner

*Primary Examiner*—Thomas Pham
(74) *Attorney, Agent, or Firm*—Sughrue Mion, PLLC

(57) ABSTRACT

An engineering system (1) and an associated automation system (1), whose components cooperate in accordance with specifications from the engineering system. These systems include a database (3) and at least one first and one second production module (20), which have an input interface (21) and an output interface (22). Each input interface (21) has a predefined number of inputs (23, 24) and each output interface (22) has a predefined number of outputs (25, 26). The database (3) contains a number of data records (31, 32, 33), each including at least one data item. Each one of the data records (31, 32, 33) is associated with a respective input (23, 24) and a respective output (25, 26).

25 Claims, 2 Drawing Sheets

ENGINEERING AND AUTOMATION SYSTEM

This is a Continuation of International Application PCT/DE02/04294, with an international filing date of Nov. 22, 2002, which was published under PCT Article 21(2) in German, and the disclosure of which is incorporated into this application by reference.

FIELD AND BACKGROUND OF THE INVENTION

The invention relates to an engineering system on the one hand and an automation system on the other, each equipped with a software component, which is hereinafter referred to as a production module.

Today, in production technology, for example, an increasing amount of data is acquired in the course of production for a wide variety of reasons, e.g., logistics, quality assurance, statistics or for subsequent production steps. These data either relate to the product itself or are relevant for the operator or service personnel or for the subsequent production steps to control the corresponding production machines. To handle the data volume, data processing hardware, in particular standard PCs, are frequently used in addition to the automation hardware, which controls the individual production steps. This data processing hardware is used only to collect and transport and, in some cases, display the data. The data processing is solved directly and variously using the standard tools of the corresponding operating systems, communication media and protocols, databases, etc. with standards developed in house. This is inconsistent with the goal of standardization in the automation of technical processes. In addition, individualized solutions that can be created and maintained only by trained personnel are expensive to procure and maintain.

OBJECTS OF THE INVENTION

Thus, one object of the invention is to provide a standardization of the data processing. Another, associated object is to provide a standardization that is largely based on the already common standards in the field of automation and thus can be readily integrated in the methodology for implementing complex automation systems, beginning with, e.g., control of an individual actuator up through, e.g., processing of management engineering systems data.

As a result, the corresponding tasks could be handled in a familiar environment by the automation personnel who do the actual control programming.

The invention assumes that a special functionality, hereinafter referred to as a production module, would make it possible to handle the data volume particularly efficiently.

SUMMARY OF THE INVENTION

These and other objects of the invention are attained, on the one hand, by an engineering system in which the number and the functionality of the production modules required for a specific automation task are defined, and are attained, furthermore, by an automation system in or with which these production modules are used.

Thus, according to the invention, an engineering system is provided, with a database and at least one first and second production module, each of which has an input interface and an output interface. Each input interface has a predefined number of inputs and each output interface a predefined number of outputs. The database contains a number of data records, each including at least one data item, and each of the data records is assigned, respectively, to each input and each output. The database includes all the data to be processed in an automation task, in particular the data to be processed across stations in an automation task with distributed automation stations. The data does not include, e.g., states of the automated process, e.g. "limit switch assigned" or "motor forward," but does include, e.g., product-related data generated or changed in connection with the process.

The production module is a software component for processing data of the aforementioned type, which offers a standardized interface for individual production units or production steps within an automated production process.

An automation task typically networks or coordinates a plurality of production units or production steps in accordance with the planned production process. For each production unit or production step at least one production module is provided. The minimum configuration thus includes a first and a second production module, which exchange data. To accept data of the above-described type, each production module has an input interface. Data that the production module generates or changes can be fetched via an output interface associated with the production module. Each input interface has a predefined number of inputs and each output interface a predefined number of outputs. The number of inputs and outputs can be individually selected for each production module according to the respective requirements.

To represent a collection of data that belong together, the database has a number of data records, each of which includes at least one data item. A data record with only one data item, for example, is a data record that identifies or references the corresponding production station or production step. A data record with more than one data item, for example, is a data record for storing error information, which includes not only an entry referencing the production step or production station but also, e.g., an entry storing the date and time and at least one entry identifying the error that occurred. Furthermore, an additional—in particular a dynamic—data item may be provided to reference or identify the products affected by the error. Each input and output of every production module can be assigned one of these data records, such that, for example, error information from one production unit or production step can be forwarded to other components, in particular other production modules within the automation system.

Advantageously, each production module has a trigger input. When this trigger input is activated, the data records assigned to the corresponding inputs are accepted, in particular, from the database. The trigger input can be used to control the timing of the acceptance of data. Since the database is a global database, whose data records may be accessed by more than one production module, it is important to be able to specify in a defined manner at which instant a data record is accepted from the database, since acceptance of a data record from the database makes sense only if any prior processing or changing of this data record by another production module has been completed. The activation of the trigger input is correlated with the instant when a product reaches the corresponding production unit or when the corresponding production step is started on this product.

If the first production module can be interlinked with the second production module or, in more general terms, if one of the production modules can be interlinked with another production module, the data flow and, in particular, the instant of the data flow between the individual production modules can be specified. By assigning each production module to a production process and accepting the data records assigned to the outputs in the database after the production process has been completed, it is ensured, on the one hand, that only complete data records are accepted in the database and, on the other hand, that this acceptance process needs to occur only once, so that the amount of data to be transmitted is reduced. A production process can be assigned either to a production station or a production step.

Advantageously, once the production process to which the first production module is assigned has been completed, the data records assigned to the corresponding inputs of the linked second production module are accepted, e.g., in particular from the database. The completion of a production process to which a production module is assigned is a suitable instant for a production module that is linked with this production module to accept the data records assigned to the inputs of the linked production module. The trigger input of a production module is either this linkage or an additional input, via which a stimulus can be transmitted to the production module in addition to the trigger input to prompt it to accept the data records assigned to the corresponding inputs.

As an alternative, or in addition thereto, a data exchange may be specified via a link between a first and a second production module. This link can be used, for example, to link an output of a first production module with an input of a second production module, so that if, for example, a data record with error information is present at the corresponding output of the first production module, it can be transmitted directly to the corresponding input of the second production module, which in this case must be provided to accept error messages. In such a procedure, there can be more than one link between the first and the second production module.

Advantageously, each data record of the database is assigned an identifier or type information and, in particular, a format. The identifier makes it easier to identify and reference the data record. The type information facilitates access to a data item of the data record. This is a device known from the so-called high-level programming languages for the so-called composite data types. A format that can be optionally assigned to the data record, possibly also to an individual data item within the data record, enables the consistent representation of one and the same data item by different production modules across the entire automation project.

The number and functionality of inputs and outputs can be individually specified for each production module. The inputs of a production module are provided to accept the data to be supplied in the production step and to directly control and/or parameterize the corresponding production hardware. The outputs of the production module are provided to output and possibly forward the data acquired in the production step. Each production module has access to a global database, which contains, for example, data to identify the corresponding product and—if the production system is configured to produce different products—possibly data to identify the different products. Data or associated type definitions for storing error information or data for storing statistical information are also provided.

For each production module the number of the inputs and outputs can be freely selected. When an input of a production module is generated, the type of the data that can be transferred via this input to the production module can be selected. This selection is done by means of data types defined in the global database.

At least one input is typically provided for each production module, which is used to transmit a product identification to that production module. The product identification is used to establish and parameterize the production station, e.g., if in a component insertion machine the component placement on a circuit board of a first dimension turns out differently from the component placement of a circuit board with a different dimension on the same component insertion machine. Furthermore, each production module typically has at least one input that specifies the actions to be carried out at the production station. In the case of a component insertion process, e.g., where the components are inserted in a printed circuit board, these data include component data describing, in particular, the type and number of the components to be inserted and their position on the printed circuit board. If only transistors are inserted at a first production station, the component data include a specification of the transistors within the above-described scope. For a production module relating to a production station where resistors are inserted in another production step, the component data include the corresponding specifications for the resistors, etc. To track errors or, generally, to monitor production for statistical purposes, each production module typically has an output used for error information and/or an output used for data relating to the production steps that have been completed successfully. The linkage of the production modules, which is represented in the engineering system by simple graphic means, e.g. connecting lines, defines possible data flow paths.

The manner in which data are exchanged between the individual production stations, and thus between the corresponding production modules, is defined by the inputs of the corresponding production modules. The following is an example for illustration purposes: If the automation system includes, for example, a data archive, each production module that generates data or changes existing data will be directly or indirectly connected with the data archive. The production module of the data archive has an input for each possible data item, e.g., error information, statistical information, etc. Only through the connection configured in the engineering system between the production module of a production station and the corresponding production module of the data archive can the data exchange between the two stations of the automation system be ensured without the corresponding operator having to worry about the details of data transmission, e.g., controlling the hardware, communication protocols, etc.

Each production module has internal software-implemented tools to control the corresponding hardware of the production station. The single "interconnection" to be made by a user of the engineering system according to the invention is the assignment of the inputs of the production module to the corresponding inputs of the control software and the assignment of the outputs of the control software to the outputs of the production module.

The objects of the invention are further attained by an automation system with at least one automation device, a database and at least one first and one second production station. The first production station is assigned at least one first production module and the second production station at least one second production module, each with an input interface and an output interface. Each input interface has a predefined number of inputs and each output interface a predefined number of outputs. The database has a number of data records, each including at least one data item, and each of the data records is assigned to a respective input and a respective output. The first and the second production stations are controlled and/or monitored by the automation device in a manner known per se. The term production station—as used also in the explanations given above—denotes, on the one hand, specific production hardware, e.g., a pick-and-place robot for inserting components on a printed circuit board, but, in addition or alternatively, also a production step, e.g., one which is carried out at a production station where other production steps are carried out as well. To be cited as an example is a device where—in a first production step—components are first inserted in a printed circuit board and—in a second production step—the inserted components are soldered.

The automation system includes an automation device, e.g., a stored-program controller, with a processing functionality and means for accepting data from a controlled and/or monitored process and means for outputting data to this process, particularly to control the corresponding process peripherals. The automation system further includes at least two production modules, which need not be spatially or functionally separated, but between which data pertaining to the automation process are exchanged.

The explanations provided above and below, to the extent that they relate to the production module, apply analogously to corresponding advantageous further refinements of the automation system.

The engineering system and the automation system are essentially distinguished from one another in that the engineering system is used to define the type and number of the production modules and their interfaces and a possible interlinkage as described above. The specifications thus made are used to generate a control program, or a plurality of control subroutines. This program and/or these subroutines are loaded into the components of the automation system that are used to process such control programs, e.g. a control device to control a unit for inserting components in a printed circuit board or an external processing unit associated with this control device and having a functionality for processing control programs. In other words, what has been planned or configured by means of the engineering system is used in or on the automation system.

An advantageous further refinement of the automation system according to the invention consists of providing a data server, which manages a data archive, and an associated data server production module, which has the same functionality as the first or the second production module—as described above—and is linked with the first and/or the second production module. Such a data archive serves for long-term storage of product or process-related data acquired in the production process, e.g., when and on which hardware a specific product has been manufactured, whether errors occurred during the manufacture of the product, and, if so, which errors occurred how and where, and the means that were used to correct them. Every manufacturer must generate such data in connection with its obligation to track products, such that the data can be uniquely assigned to a specific product even after a relatively long period of time to enable the manufacturer to show, in the event that a product is defective, that it had done everything possible to ensure that the product passed and left the production process without defects.

The aforementioned production module thus has at least one input to accept a data record with error information and in addition, or as an alternative thereto, an input to accept a data record with general statistical information for the production process with product-related and/or process-related data. Such data are typically supplied by each production module assigned to a production station or a production step.

The linkage of the data of this production module with the first and/or the second production module is an example in which the stimulus to accept the data, in this case to accept the input data of the production module assigned to the data server, is suitably correlated with the completion of a production process in a production station to which the first or the second production module is assigned.

In an advantageous embodiment, the engineering system is a component of the automation system, so that the type and functionality of the production modules, or the linkage between them, can be adapted at any time.

BRIEF DESCRIPTION OF THE DRAWINGS

An embodiment of the invention will now be described, by way of example, with reference to the figures in which.

DETAILED DESCRIPTION OF THE PREFERRED EMBODIMENTS

Figure 1:
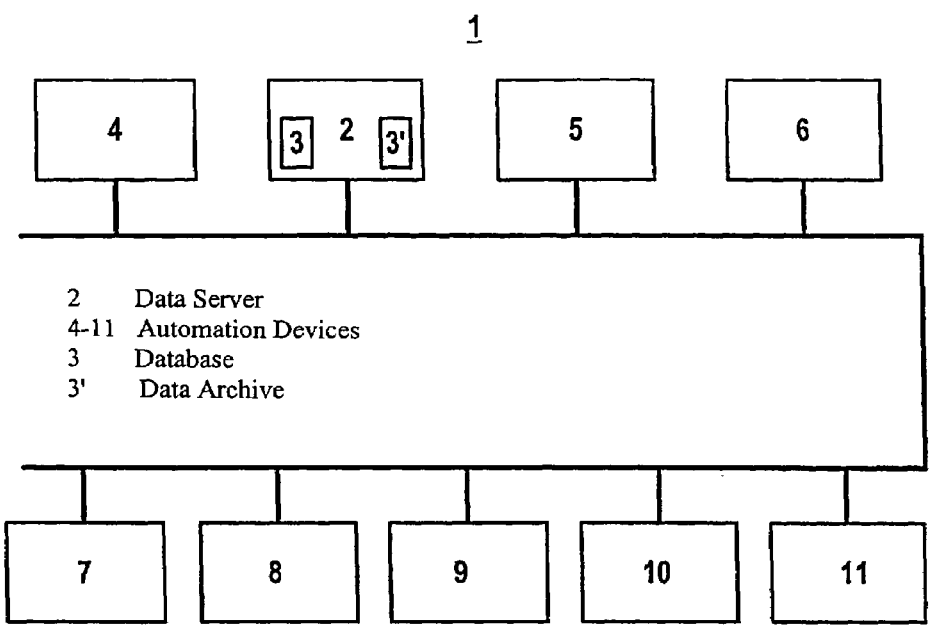
FIG. 1 is a schematic of an automation system.

An automation system 1 includes a data server 2 and at least one automation device 4, 5, 6, 7, 8, 9, 10, 11, e.g., a stored-program controller with a processing functionality and means for acquiring data from a controlled and/or monitored process and means for outputting data to this process, particularly to control the corresponding process peripherals. The automation system 1 further includes at least two production modules 20 (FIG. 2), which need not necessarily be spatially or functionally separated, but between which data relating to the automation process is exchanged.

The data server 2 includes a database 3 and a data archive 3'. The database 3 includes all data relevant to the current production process in the automation system 1. The data archive 3' includes old data, which are no longer relevant to the current production process, but which are kept available for documentation purposes.

Each automation device 4 . . . 11 controls a production station 4 . . . 11 or the production process 4 . . . 11 running thereon. The terms automation device, production station and production process are used overlappingly here.

Figure 2:
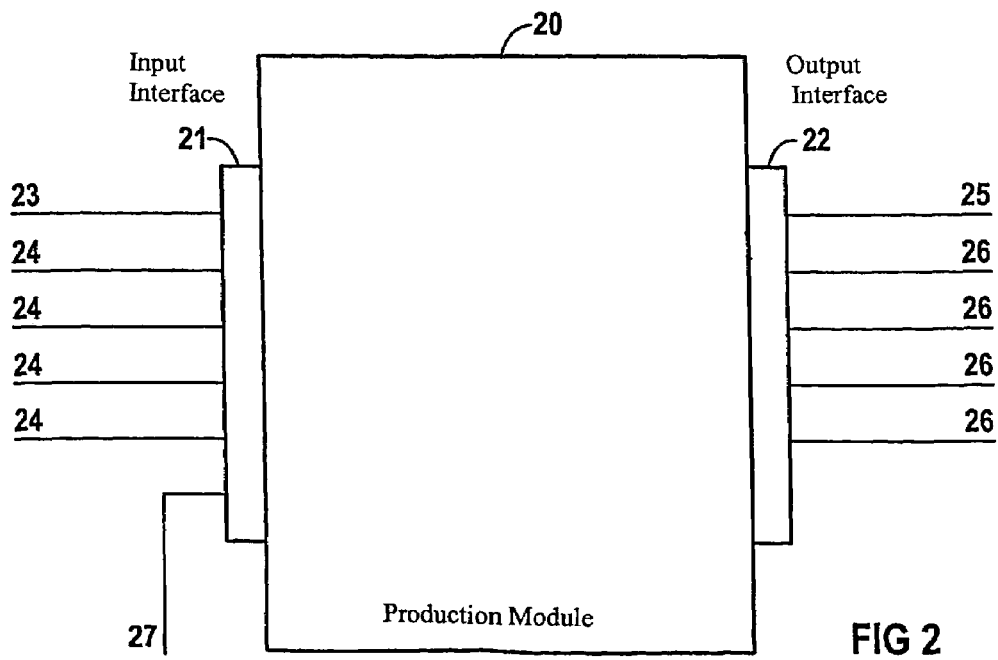
FIG. 2 shows a production module.

FIG. 2 is a schematic of a production module 20 with an input interface 21 and an output interface 22. The input interface 21 is assigned a number of inputs 23, 24. Correspondingly, the output interface 22 is assigned a number of outputs. The production module 20 further has a trigger input 27 via which a stimulus can be transmitted to the production module 20 to accept data through the inputs 23, 24.

Figure 3:
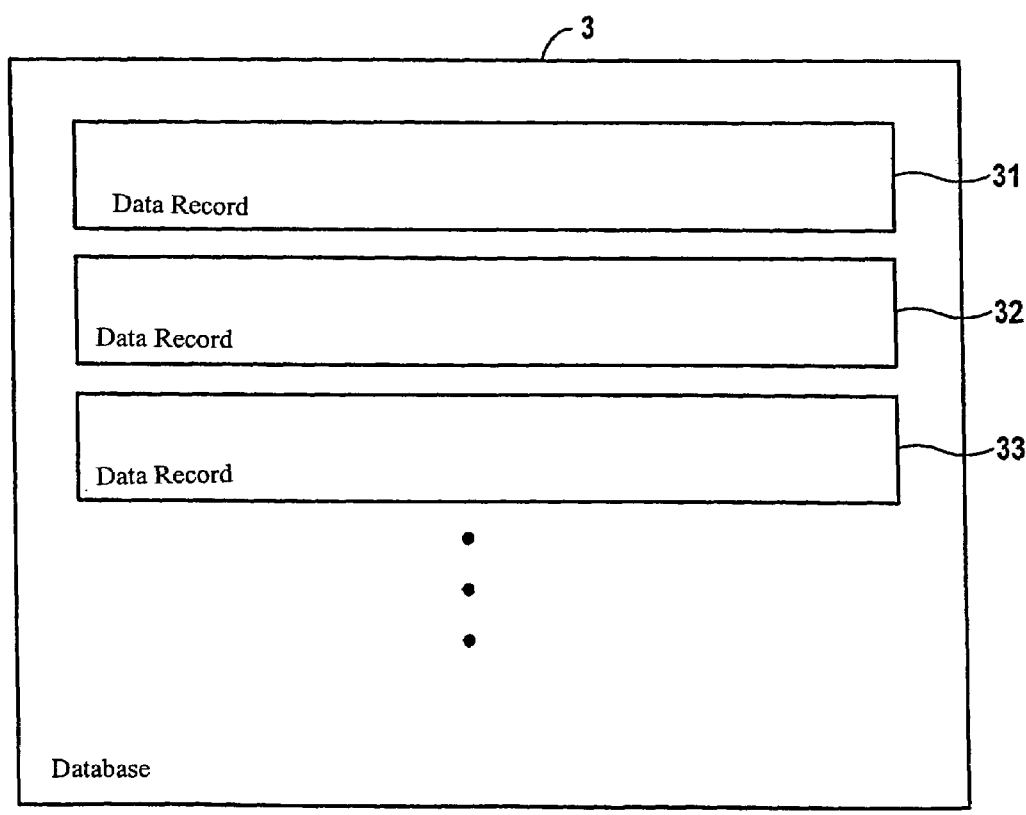
FIG. 3 shows a database with data records.

FIG. 3 shows the database 3 with some data records 31, 32, 33. The database 3 can also be configured as a distributed database 3 (not depicted), which is kept available in whole or in part in each production station 2, 4 . . . 11.

With reference to FIG. 1, two of the production stations 4, 5 are, for example, a first and a second repair station 4, 5, three of the production stations 6, 7, 8 are, for example, a first, second and third component insertion station 6, 7, 8, one of the production stations 9 is, for example, a soldering station 9, a further production station 10 is, for example, an inspection station, and a last production station 11 is, for example, an assembly station 11.

This enables the automation system 1 to control the production process, e.g., a printed circuit board manufacturing process. When a printed circuit board is delivered, e.g., to a component insertion station 6, 7, 8, the trigger input 27 of the production module 20 assigned to the corresponding component insertion station 6, 7, 8 is engaged, such that the data assigned to the inputs 23, 24 are accepted from the database 3. The data accepted from the database 3 show how the components are to be inserted in the printed circuit board (type and position of the components). The same applies, for example, to a soldering station 9, in which the data accepted from the database by the associated production module 20 determine the procedure and the boundary conditions under which the components inserted on the printed circuit board are to be soldered.

If errors occur during the component insertion process 6, 7, 8 or the soldering process 9, corresponding data are entered into the database 3 by means of the outputs 25, 26 of the production module 20 at whose production step 6, 7, 8, 9 the error occurred. As soon as the faulty printed circuit board reaches a repair station 4, 5, these data can be accessed by means of the inputs 23, 24 of the production module 20 of the repair station 4, 5, to localize and if possible repair the error.

Thus, the invention can be briefly summarized as follows: An engineering system 1 and a corresponding automation system 1, the components of which cooperate in accordance with the specifications from the engineering system, have a data base 3 and at least one first and one second production module 20, each of which has an input interface 21 and an output interface 22. Each input interface 21 has a predefinable number of inputs 23, 24 and each output interface 22 a predefinable number of outputs 25, 26. The database 3 has a number of data records 31, 32, 33, each of which contains at least one data item, and each of the data records 31, 32, 33 can be assigned to a respective input 23, 24 and a respective output 25, 26.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An engineering system, comprising:
    a database, and
    at least one first and one second production module, which each have an input interface and an output interface,
    wherein each of the first and second production modules is assigned to a respective production process in an automation system,
    wherein each input interface comprises a predefined number of inputs and each output interface comprises a predefined number of outputs, and
    wherein the database comprises a number of data records, each of which comprises at least one respective data item, and wherein each of the data records is associated with a respective one of the inputs and a respective one of the outputs.

2. The engineering system as claimed in claim 1, wherein the first production module is linked with the second production module.

3. The engineering system as claimed in claim 1, wherein each production module is associated with a respective production process, and wherein the data records associated with the respective outputs are accepted into the database after completion of the respective production process.

4. The engineering system as claimed in claim 3,
    wherein the first production module is linked with the second production module, and
    wherein, upon completion of the respective production process with which the first production module is associated, the data records associated with the respective inputs of the linked second production module are accepted.

5. The engineering system as claimed in claim 4, wherein the respective data records are accepted from the database.

6. The engineering system as claimed in claim 1, wherein each data record is associated with at least one of an identifier and type information.

7. The engineering system as claimed in claim 6, wherein each data record is associated with a format.

8. The engineering system as claimed in claim 1, wherein each of the production processes is a technical automated process.

9. The engineering system as claimed in claim 8, wherein the technical automated process relates to manufacturing or repairing physical objects.

10. An engineering system, comprising:
    a database, and
    at least one first and one second production module, which each have an input interface and an output interface,
    wherein each input interface comprises a predefined number of inputs and each output interface comprises a predefined number of outputs,
    wherein the database comprises a number of data records, each of which comprises at least one respective data item, and wherein each of the data records is associated with a respective one of the inputs and a respective one of the outputs, and
    wherein each production module comprises a trigger input, upon whose activation the data records associated with the respective inputs are accepted.

11. The engineering system as claimed in claim 10, wherein the respective data records are accepted from the database and wherein the trigger input controls timing of the acceptance of the data records.

12. An automation system, comprising:
    at least one automation device,
    a database, and
    at least one first and one second production station that is at least one of controlled and monitored by the automation device,
    wherein the first production station is associated with at least one first production module and the second production station is associated with at least one second production module, each of which has an input interface and an output interface,
    wherein each input interface has a predefined number of inputs, and each output interface has a predefined number of outputs,
    wherein the database has a number of data records, each of which comprises at least one data item, and
    wherein each of the data records is associated with a respective one of the inputs and a respective one of the outputs.

13. The automation system as claimed in claim 12, wherein each production module comprises a trigger input, upon whose activation the data records associated with the respective inputs are accepted.

14. The engineering system as claimed in claim 13, wherein the respective data records are accepted from the database.

15. The automation system as claimed in claim 12, wherein the first production module is linked with the second production module.

16. The automation system as claimed in claim 12, wherein each production module is associated with a respective production process, and wherein the data records associated with the respective outputs are accepted into the database after completion of the respective production process.

17. The automation system as claimed in claim 16,
   wherein the first production module is linked with the second production module, and
   wherein, upon completion of the respective production process with which the first production module is associated, the data records associated with the respective inputs of the linked second production module are accepted from the database.

18. The automation system as claimed in claim 12, wherein each data record is associated with at least one of an identifier and type information.

19. The engineering system as claimed in claim 18, wherein each data record is associated with a format.

20. The automation system as claimed in claim 12, further comprising:
   a data server managing a data archive, and
   a data server production module that is associated with the data server, that has a functionality of at least one of the first and the second production module, and that is linked with at least one of the first and the second production module.

21. The automation system as claimed in claim 12, wherein the automation device monitors the first and second production stations and wherein the automation device is separate from the first and second production stations.

22. An automation system having an engineering system comprising:
   a database, and
   at least one first and one second production module, which each have an input interface and an output interface,
   wherein each of the first and second production modules is assigned to a respective production process in the automation system,
   wherein each input interface comprises a predefined number of inputs and each output interface comprises a predefined number of outputs, and
   wherein the database comprises a number of data records, each of which comprises at least one respective data item, and wherein each of the data records is associated with a respective one of the inputs and a respective one of the outputs.

23. The automation system as claimed in claim 22, wherein each of the production processes is a technical automated process.

24. The automation system as claimed in claim 23, wherein the technical automated process relates to physically transforming an object.

25. An engineering system, comprising:
   a database, and
   at least one first and one second production module, which each have an input interface and an output interface,
   wherein each input interface comprises a predefined number of inputs and each output interface comprises a predefined number of outputs,
   wherein the database comprises a number of data records, each of which comprises at least one respective data item, and wherein each of the data records is associated with a respective one of the inputs and a respective one of the outputs, and
   wherein at least one of the data records indicate placement of components on a printed circuit board and wherein the at least one of the data records indicates type and position of one of the components.

* * * * *